MACHINE FOR THE PRODUCTION OF ROPES AND STRANDS

Filed March 20, 1967 5 Sheets-Sheet 1

Désiré Coleta Cloostermans-Huwaert
INVENTOR

BY Stevens, Davis, Miller & Mosher
ATTORNEYS

MACHINE FOR THE PRODUCTION OF ROPES AND STRANDS

Filed March 20, 1967

INVENTOR
Désiré Coleta Cloostermans-Huwaert

BY Stevens, Davis, Miller & Mosher
ATTORNEYS

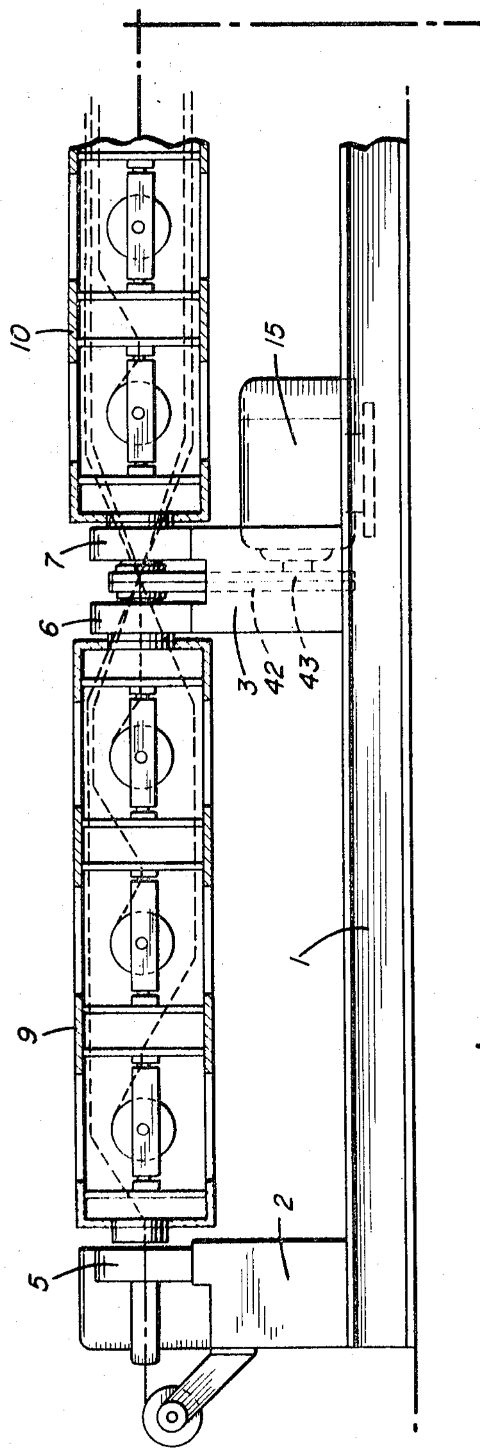
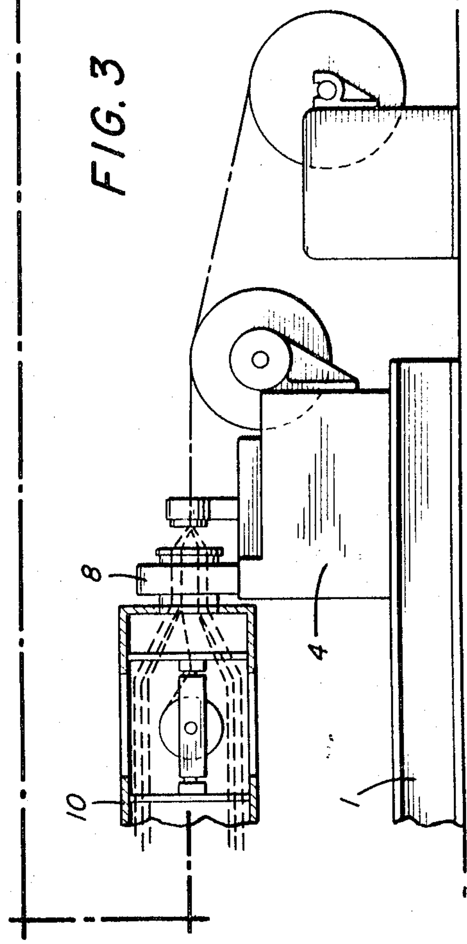
FIG. 3
Désiré Coleta
Cloostermans-Huwaert
INVENTOR
BY Stevens, Davis, Miller & Mosher
ATTORNEYS MACHINE FOR THE PRODUCTION OF ROPES AND STRANDS
Filed March 20, 1967 5 Sheets-Sheet 4
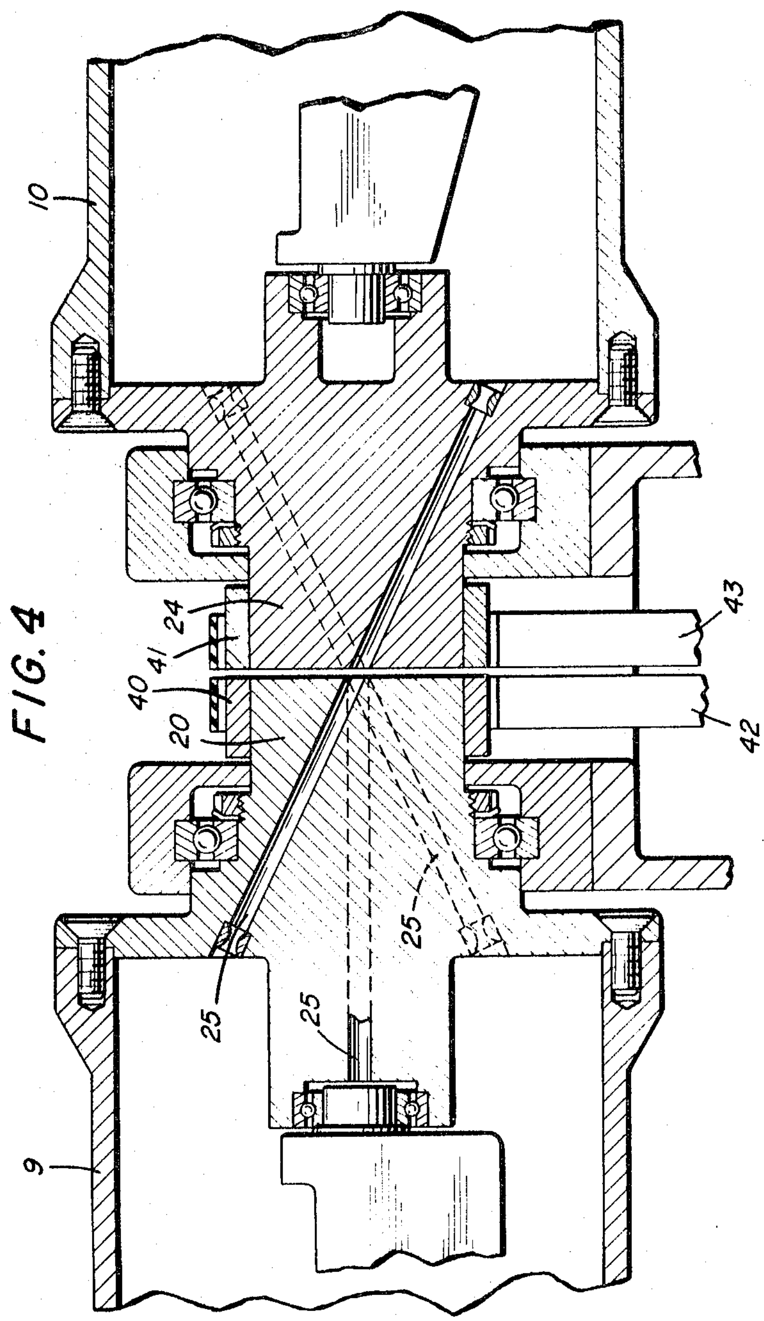
INVENTOR
Désiré Coleta Cloostermans-Huwaert
BY Stevens, Davis, Miller & Mosher
ATTORNEYS

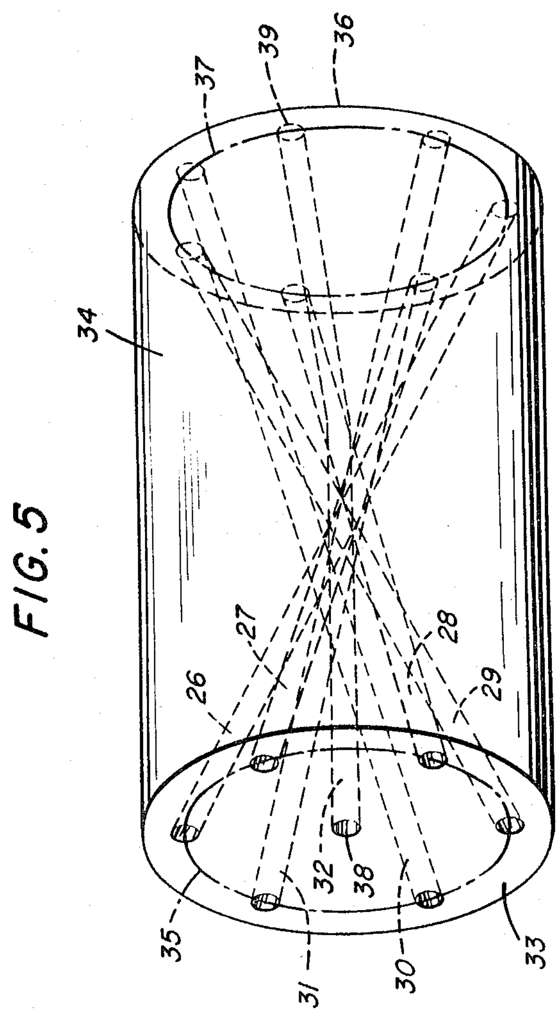
Désiré Coleta Cloostermans-Huwaert
INVENTOR
BY Stevens, Davis, Miller & Mosher
ATTORNEYS

United States Patent Office 3,456,433 Patented July 22, 1969

3,456,433

MACHINE FOR THE PRODUCTION OF ROPES AND STRANDS

Désiré Coleta Cloostermans-Huwaert, 31 Durmestraat, Hamme, Belgium

Filed Mar. 20, 1967, Ser. No. 624,482
Claims priority, application Belgium, Mar. 28, 1966, 678,555
Int. Cl. D01h *7/02;* D07b *3/02*
U.S. Cl. 57—59 4 Claims

ABSTRACT OF THE DISCLOSURE

A machine for the production of ropes and strands and which comprises at least two tube parts connected together by elastic coupling means and supported at each end of each tube part by ball bearings. The ends of each tube part have a reduced diameter thereby reducing the bearing size. Rotational drive is accomplished through toothed belts meshing with sprocket wheels on at least one of the tube parts thus providing for high speed rotations substantially free from vibration.

Figure 1:
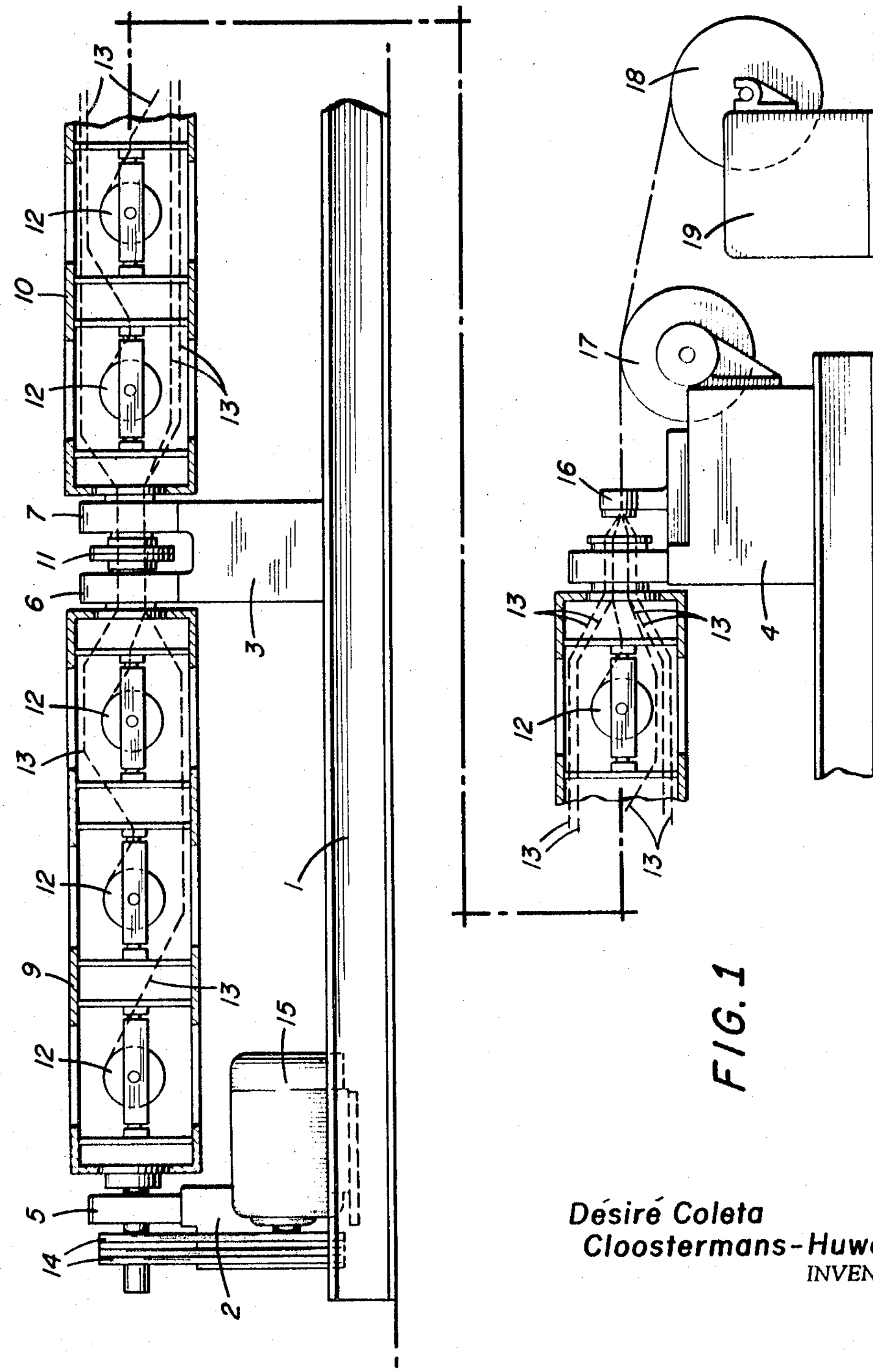

The invention relates to a machine for the production of ropes and strands comprising a tube built up from at least two parts and means to ensure the rotation of the said tube around the geometrical axis thereof.

In the machines of the kind known up to the present, the parts of the tube are solidly interconnected, so that the tube provides a single body over its entire length. This body is carried at one end in a ball bearing, eventually also at the other end in a second ball bearing, but it is carried in addition, either by rollers or in a large ball bearing the internal ring of which has an inside diameter corresponding to the outside diameter of the body. The support by means of rollers presents the disadvantage that the two rollers of a pair of bearing rollers never apply the same pressure to the tube. Consequently, at fairly high speeds, the tube does not rotate free of vibrations. Likewise, the use of a large ball bearing surrounding the tube and which is therefore of fairly large diameter limits the possible speed of rotation of the tube.

It has already been proposed to overcome these disadvantages by interconnecting the two parts of the tube by means of ends having a smaller diameter which penetrate one another. The journal-shaped part produced at the level of the connection is then housed in a ball bearing of smaller diameter, so as to make high speeds of rotation possible. In this known embodiment, the two solidly interconnected parts of the tube have to be located accurately as an extension of one another, because if this were not the case, vibrations would occur in the course of rotation. The body made up from two parts must be balanced as if it were a whole. Likewise, the connection of two parts of the tube which must be connected by means of their ends of smaller cross-section in order to provide a solid whole, necessitates a fairly complicated structure wherein the smallest inaccuracy gives rise to a clearance which in its turn provides a source of vibrations.

The invention has for its object to overcome the disadvantages of known machines of the described type and to provide a machine for the production of ropes and strands which may comprise an extended tube and nevertheless allow a high speed of rotation of the said tube without vibrations taking place. Moreover, the construction of the contemplated machine remains of a simple character.

For that purpose, the parts of the tube are assembled separately and are not solidly connected.

In an advantageous form of embodiment of the invention the parts of the tube, assembled separately, are interconnected in an elastic manner.

In an advantageous manner, each part of the tube is carried in two ball bearings which surround the ends of reduced cross-section of the parts of the tube and the adjacent ends of the two parts of the tube are connected by an elastic coupling.

In a particular form of embodiment of the invention the parts of the tube carried separately are connected to driving members connected with one another.

In a noteworthy form of embodiment the driving members comprise toothed belts which mesh with sprocket wheels mounted on the ends of the parts of the tube and in a common motor driven sprocket wheel.

In a very particular form of embodiment of the invention channels are provided in the facing ends of adjacent parts of the tube, channels located in part in one end and in part in the other end and the axes thereof are located on a hyperboloid.

It should be noted that a machine for the production of ropes and strands the reels of which are each assembled separately in two ball bearings of fairly large diameters is already known. This known machine, however, does not comprise a tube, and is therefore provided per se with a driving mechanism which is different from the driving mechanism of machines for the production of ropes and strands comprising a rotary tube made up from several parts.

Other features and advantages of the invention will become apparent from the description given hereinafter of two forms of embodiment of a machine for the production of ropes and strands according to the invention. This description is only given by way of example and does not limit the invention; the reference numerals refer to the accompanying drawings.

FIGURE 1 is a front view, in part diagrammatic, of a machine for the production of ropes and strands according to the invention.

Figure 2:
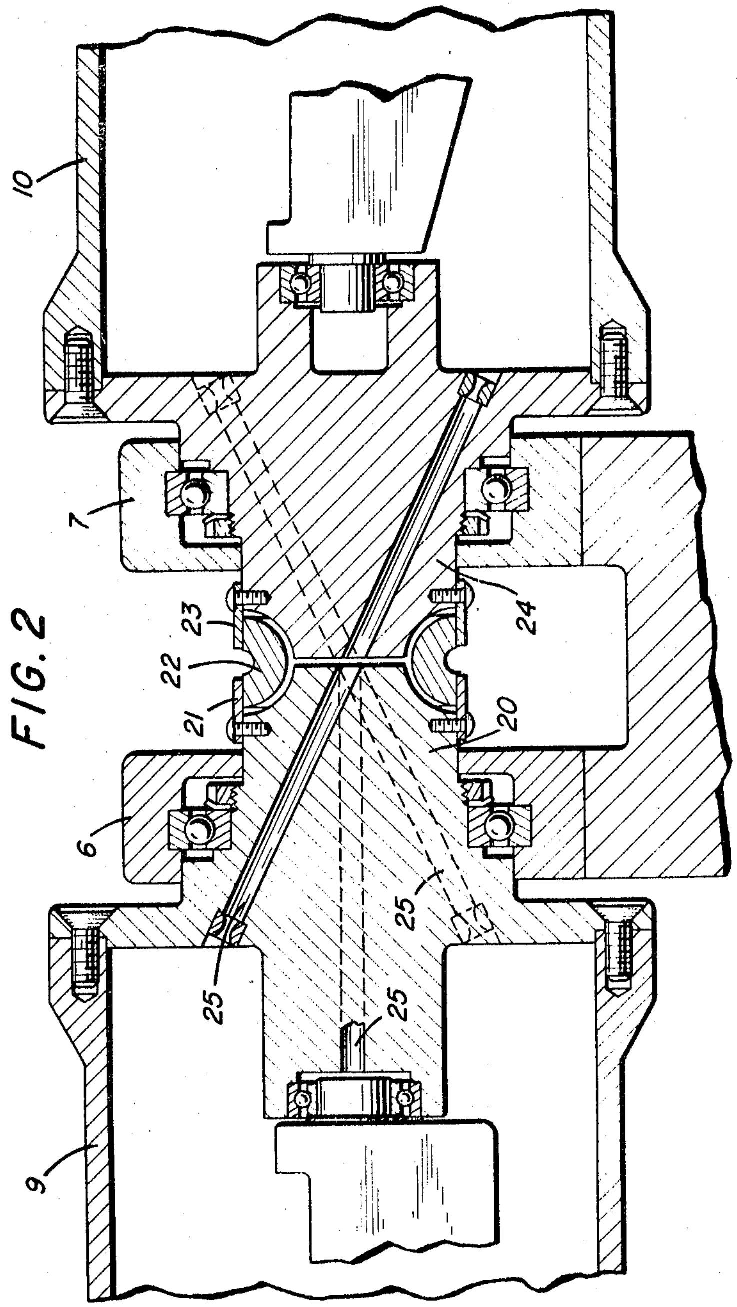

FIGURE 2 repeats, on a larger scale and in section, a part of what is shown in FIGURE 1.

FIGURE 3 is a front view, in part diagrammatic, of a second machine for the production of ropes and strands according to the invention.

FIGURE 4 repeats, on a larger scale and in section, a part of what is shown in FIGURE 3.

FIGURE 5 is a perspective view relative to the passage of yarns or strands at the level of the connection between two adjoining parts of the tube.

In the different figures the same reference numerals refer to identical components.

On the machine shown in the FIGURES 1 and 2 may be produced strands from yarns, for example yarns made from natural or synthetic fibers or metal wires, for example iron wires or wires from non ferrous metals. This machine also permits the production of ropes from strands. The operation of the machine is not different from the operation of known machines. Only the connection between two members of the tube and the bearing housing said parts are different.

The machine comprises a frame 1 with supports 2, 3 and 4 for the ball bearings 5, 6, 7 and 8. In the ball bearings are mounted the parts 9 and 10 of the tube; this assembly is described in detail hereinafter. The parts of the tube 9 and 10 are interconnected by an elastic coupling which carries the reference 11 in FIGURE 1 and which is shown in greater detail in FIGURE 2. In the part 9 of the tube and in the part 10 of the tube are mounted the reels 12 and are guided the wires or strands 13 for the build up of strands or of ropes.

The elastically connected parts 9 and 10 of the tube are brought into rotation on account of the fact that the part 9 of the tube is driven at one end by the belts 14 which are themselves driven by an electric motor 15.

The strand or rope 16 thus produced, which leaves the machine by the end of the part 10 of the tube, passes through the drawing mechanism 17 and reaches the coiling reel 18 mounted on a separate support 19.

The part 9 of the tube is carried, on one side, by and end of reduced cross-section in a ball bearing 5 and is carried in the ball bearing 6 by another end 20 likewise of smaller cross-section. The member 21 which is part of the journal-shaped end 20 of the part 9 of the tube is connected by means of the elastic member 22 to the member 23 which is part of the journal-shaped end 24 of the part 10 of the tube. This journal-shaped end 24 is housed in a ball bearing 7. The part 10 of the tube is housed, on the other side, in a ball bearing 8.

It follows from the above that the parts 9 and 10 of the tube, while being driven by a motor 15 so that the part 10 of the tube is drawn into rotation by the part 9 of the tube, remain nevertheless independent one from the other, insofar as the parts 9 and 10 of the tube are only interconnected by means of the elastic coupling 11. This offers very considerable advantages.

When one of the parts of the tube, for example the part of the tube 10 is not accurately an extension of the other part of the tube, for example the part 9 of the tube, this nevertheless does not give rise to vibrations, because the disadvantage of the non linear connection is met by the elasticity of the coupling.

The two parts of the tube may be balanced out separately and it is evidently easier to balance out a part of the tube having a length of two meters for example than to balance out a complete tube having a length of four meters.

An elastic coupling is far simpler than a coupling which has to connect two ends of a tube of smaller cross-section solidly with one another.

It is also much easier to align accurately two ball bearings than it is the case with three ball bearings. Now in the form of embodiment according to the figures, it will be sufficient for the ball bearings 5 and 6 to be accurately aligned and that such should be the case also with ball bearings 7 and 8 while it is not so important for the straight lines set up by the ball bearings 5 and 6, on the one hand, and 7 and 8, on the other hand, to be in the extension of one another, considering that a slight deviation in that direction is permissible on account of the elasticity of the coupling 11. In this manner a satisfactory housing of each of the parts 9 and 10 of the tube is assured and the tube made up from parts 9 and 10 may rotate without any vibration.

As shown in FIGURE 2, channels 25 are provided in the journal-shaped ends 20 and 24 of the tube in order to permit the passage of the wires or strands.

The manner in which the channels 25 extend in the journal-shaped ends 20 and 24 of the parts 9 and 10 of the tube is shown in FIGURE 5, wherein in order to facilitate matters, the journal-shaped ends 20 and 24 have been shown as making up a single cylinder. FIGURE 5 applies to the case when seven yarns or wires are led through seven different channels. The geometrical axes of these channels have been distinguished by the reference numerals 26, 27, 28, 29, 30, 31 and 32. The geometrical axes 26 to 31 inclusive are located on a hyperboloid. The six points of intersection of the geometrical axes 26 to 31 inclusive with one of the bases 33 of the cylinder 34 are located on an ellipse 35. The points of intersection of the same geometrical axes 26 to 31 with the other base 36 of the cylinder 34 are also located on an ellipse 37. In a particular case the ellipses 35 and 37 are circles.

The geometrical axis 32 comprises two segments: a first segment which starts from the center 38 of the ellipse 35, i.e., from the point of intersection of the axis of the cylinder 34 with the base 33, and extends moreover along the said axis until half way between the bases 33 and 36 and a second segment which connects the end of the first segment to a point 39 located on the ellipse 37 of the base 36. The yarns or strands which are led in the channels extend therefore as far as possible according to the segments which are located on a hyperboloid. In this manner, the increase of the tension in the yarns or wires or strands, at the level of the passage of one end of the tube into the other, is reduced to a minimum. A simple passage is effected for a substantially unlimited quantity of yarns or wires or strands.

In the machine according to the FIGURES 1 and 2 may be provided a braking mechanism for one of the parts 9 and 10 of the tube or for each of the said parts.

The form of embodiment according to the FIGURES 3 and 4 differs essentially from the form of embodiment according to the FIGURES 1 and 2 in that the parts 9 and 10 of the tube are not connected by an elastic coupling at their adjacent ends.

No elastic coupling is mounted on the journal-shaped ends 20 and 24 of the parts 9 and 10 of the tube of the machine according to the FIGURES 3 and 4. These journal-shaped ends 20 and 24 are not directly connected with one another; neither in a solid manner, nor by means of an elastic member. On the journal-shaped ends 20 and 24 are located sprocket wheels 40 and 41 with which mesh the teeth of the belts 42 and 43, which are driven by the sprocket wheel fixedly mounted on the shaft of motor 15, or on the extension of the said shaft. The journal-shaped ends 20 and 24 of the parts 9 and 10 of the tube are therefore, in a certain manner, connected to the extent that these ends are driven by a non sliding transmission from one and the same motor 15. The connection between the journal-shaped ends 20 and 24 of the parts 9 and 10 of the tube is, however, carried out in the manner that the ball bearings 5, 6, 7 and 8 are necessarily aligned with one another. All the advantages described hereinbefore with reference to the machine according to FIGURES 1 and 2 are actually repeated in the machine according to the FIGURES 3 and 4.

The invention is in no way limited to the form of embodiment described hereinbefore and many changes may be made thereto within the scope of the present patent application, particularly as regards the shape, the composition, the disposition and the number of members used for the production thereof.

While the examples of embodiments described hereinbefore and shown in the figures relate to machines comprising a tube made up from two parts and provided with three reels in each tube, a smaller or larger number of reels may be provided for each part of the tube and the tube itself may also be subdivided into more than two separately carried parts. The machine may, for example, comprise two parts of the tube carried in separate ball bearings which may be driven where they meet at their ends in the manner shown in FIGURES 3 and 4 and in two parts of the tube also separately carried, which are located on the extensions of the parts of the tube mentioned in the first place and are connected thereto by elastic couplings. A construction according to the invention may therefore comprise elastic couplings such as shown in FIGURES 1 and 2 or separate driving devices such as shown in FIGURES 3 and 4. The braking may always be effected either on all the parts, or on one of them only or on certain parts.

The yarns, wires or strands may be guided inside or outside with reference to the tube. Likewise, the machine may comprise besides the reels inside the tube still one reel provided alongside of the rotary tube, such as is current practice and such as is shown in particular in the left hand part of FIGURE 3. When the machine comprises an elastic coupling, as is the case in the form of embodiment according to FIGURES 1 and 2, the motor drive may be made by means of one of the ends of the tube located close to the elastic coupling. The elastic coupling need not necessarily comprise an elastic member. The coupling may also be elastic without comprising elastic members. This is particularly the case with certain electric couplings.

It claim:

1. A machine for the production of ropes and strands comprising a frame having a plurality of supports, at least one ball bearing on each of said supports, at least two tube parts each having ends of reduced cross-section, each end of each of said tube parts being mounted in individual ball bearings in substantially axial alignment, a motor, transmission means operatively connecting said motor to at least one of said tube parts to drive said tube parts in rotation about the geometrical axis thereof, and coupling means connecting adjacent ends of said tube parts which only allow a longitudinal deflection.

2. A machine for the production of ropes and strands according to claim 1 wherein said transmission means comprises a sprocket wheel mounted on said motor and driven thereby, a sprocket wheel mounted on one of said tube parts, toothed belt means interconnecting said sprocket wheels to drive said tube, said coupling means comprising elastic coupling means connecting adjacent ends of said tube parts whereby all of said tube parts are driven by said transmission means.

3. A machine for the production of ropes and strands according to claim 1 wherein said transmission means comprises a sprocket wheel mounted on the motor and driven thereby, sprocket wheels mounted on the adjacent ends of said tube parts, and toothed belts interconnecting and meshing with said sprocket wheels on said tube part ends and said sprocket wheel on said motor.

4. A machine for the production of ropes and strands according to claim 1 further comprising canals formed in the adjacent ends of said tube parts traversing said ends and having axes which are located on a hyperboloid.

References Cited

UNITED STATES PATENTS

| | | | |
|---|---|---|---|
| 2,416,126 | 2/1947 | Somerville | 57—58.32 |
| 2,485,348 | 10/1949 | Arnason | 57—58.34 |
| 2,717,485 | 9/1955 | Pearce | 57—58.32 |
| 2,826,035 | 3/1958 | Cogger | 57—63 XR |
| 3,095,686 | 7/1963 | Steinlein | 57—58.3 |
| 3,258,905 | 7/1966 | Carter | 57—59 XR |
| 3,271,942 | 9/1966 | Griffin | 57—58.32 |

FOREIGN PATENTS

| | | |
|---|---|---|
| 1,347,148 | 11/1963 | France. |
| 325,990 | 3/1930 | Great Britain. |
| 921,626 | 3/1963 | Great Britain. |

STANLEY N. GILREATH, Primary Examiner

WERNER H. SCHROEDER, Assistant Examiner

U.S. Cl. X.R.

57—58.34, 104